US007565960B2

(12) United States Patent
Worner et al.

(10) Patent No.: US 7,565,960 B2
(45) Date of Patent: Jul. 28, 2009

(54) ABUTMENT MODULE

(76) Inventors: Helmut Worner, Johann-Sebastian-Bach-Strasse 3, Denkendorf (DE) D-73770; Sebastian Unterhuber, Rikeweg 4, Kongen (DE) D-73257

( * ) Notice: Subject to any disclaimer, the term of this patent is extended or adjusted under 35 U.S.C. 154(b) by 209 days.

(21) Appl. No.: 11/583,056

(22) Filed: Oct. 19, 2006

(65) Prior Publication Data
US 2007/0089947 A1 Apr. 26, 2007

(30) Foreign Application Priority Data
Oct. 21, 2005 (EP) ................... 05022966

(51) Int. Cl.
B65G 47/26 (2006.01)
(52) U.S. Cl. .................. 198/459.6; 198/463.4
(58) Field of Classification Search ............. 198/343.1, 198/345.1–345.3, 463.4, 463.6, 368, 419.1, 198/459.6, 459.7; 193/35 A, 35 G; 188/266
See application file for complete search history.

(56) References Cited
U.S. PATENT DOCUMENTS

| | | | | |
|---|---|---|---|---|
| 4,088,221 A * | 5/1978 | Bowser | .................... | 198/463.4 |
| 4,397,386 A * | 8/1983 | Kampf | .................... | 198/464.4 |
| 4,662,500 A * | 5/1987 | Agnew | ....................... | 193/40 |
| 5,199,537 A * | 4/1993 | Worner et al. | ................ | 188/266 |
| 5,676,235 A * | 10/1997 | Sam et al. | ................. | 198/345.3 |
| 5,911,297 A * | 6/1999 | Unterhuber | ............... | 193/35 A |
| 6,763,930 B2 * | 7/2004 | Johnson et al. | .......... | 198/459.6 |
| 7,007,791 B2 * | 3/2006 | Stingel et al. | ................ | 198/368 |
| 7,249,666 B1 * | 7/2007 | Robinson | ................... | 193/35 A |
| 2003/0145667 A1 * | 8/2003 | Donald et al. | .............. | 74/89.26 |
| 2005/0104268 A1 * | 5/2005 | Migliori | ....................... | 269/47 |

FOREIGN PATENT DOCUMENTS

| | | |
|---|---|---|
| DE | 38 32 865 C1 | 7/1989 |
| DE | 38 06 436 A1 | 9/1989 |
| EP | 0 484 648 A1 | 5/1992 |

* cited by examiner

Primary Examiner—Gene Crawford
Assistant Examiner—William R Harp
(74) Attorney, Agent, or Firm—Browdy and Neimark, P.L.L.C.

(57) ABSTRACT

An abutment module, in particular for automatic processing and conveying systems, including an abutment member, arranged on a base body, for articles moving in a plane of motion in a current working direction, an electrical servo member capable of shifting the abutment member back by a downward stroke out of the plane of motion and by an upward stroke back into the plane of motion, a damping mechanism, coupled with the abutment member, to shift the abutment member from a first abutment position to a second terminal position in a damped manner and a return mechanism for the return of the abutment member from the terminal abutment position to the first abutment position.

11 Claims, 3 Drawing Sheets

ABUTMENT MODULE

BACKGROUND OF THE INVENTION

The invention relates to an abutment module, in particular for automatic processing and conveying means, comprising an abutment member, arranged on a base body, for articles moving in a plane of motion in a current working direction, which by means of an electrical servo member is able to be shifted by a downward stroke out of this plane of motion and by means of an upward stroke back into the plane of motion, a damping means, coupled with the abutment member, in order to shift the abutment member from a first abutment position to a second terminal abutment position in a damped manner and return means for the return of the abutment member from the terminal abutment position to the first abutment position.

THE PRIOR ART

Fluid power operated abutment modules are known, see for example the European patent publication 0 484 648. The abutment described therein is able to be shifted by means of a pneumatically operated servo piston out of the path of movement of approaching workpieces and back into same. For compressed air actuation a compressed air connection is provided on the housing, by way of which compressed air may be supplied in a controlled fashion. Furthermore, a damping means is provided for the abutment so that the movement of the abutting workpieces can be damped. The shifting of the abutment member out of the terminal abutment position into the first abutment takes place in this case as well by way of the controlled supply of compressed air.

In certain automatic processing and conveying means compressed air driven abutment modules are however unsuitable, since an air leak may lead to an impairment of the process being implemented. As an example coating lines are to be mentioned. In order to provide a remedy abutment modules have already been suggested, whose abutment members are able to be shifted by means of an electrical servo drive out of the plane of motion of the articles and back into it. In the case of particular processing and conveying operations it is necessary to cause the articles, which are to be singulated, to abut in a damped manner, since otherwise damage to the articles or, respectively, to the abutment module might occur, if the articles are violently impacted. For this purpose the above mentioned damping means have been developed, which however also operate using externally supplied compressed air, i. e. the abutment member is shifted by compressed air back into its home position.

SHORT SUMMARY OF THE INVENTION

One object of the invention is to create an abutment module of the type initially mentioned which despite the presence of a damping means operates without compressed air connections.

These and/or other objects appearing from the present specification, claims and drawings, are to be achieved using an abutment module with the features of the independent claim 1 or by an abutment module with the features of the independent claim 12. Further developments of the invention are defined in the claims.

The abutment module in accordance with the invention as recited in claim 1 is characterized in that as a return means at least one energy storage means is provided, which is able to be charged by the downward stroke of the electrical servo member and whose stored energy is available for return of the abutment member into the first abutment position. The abutment module in accordance with the invention as defined in claim 12 is characterized in that as a return means a further electrical servo member is provided. The two above mentioned designs share the feature that the abutment module is operated without compressed air supplied from the outside, that is to say it does not have any compressed air connections. The abutment module in accordance with the invention may therefore be utilized in various different automatic processing and conveying systems, and in particular in those, in which the use of compressed air would be critical, as described above. In the case of the energy storage means design the downward stroke of the electrical servo member is employed and with the accompanying charging of an energy storage means, whose stored energy then causes the outward motion or retraction of the abutment member into the starting position or, respectively, first abutment position. In the case of design with the servo drive the return of the return abutment member is performed using an additional electrical drive.

In the case of one further development of the invention it is a question of a pressure storage means, whose pressure is increased by the downward stroke of the electrical servo member and which then makes the stored pressure energy available for the return of the abutment member. As an alternative to this or additionally the energy storage means may be at least one spring element, which is stressed by the downward stroke of the electrical servo member, its stored return energy causing the return of the abutment member.

In a particularly preferred fashion the pressure storage means may comprise at least one pressure chamber with gaseous medium, which is able to be compressed by a piston kinematically coupled with the electrical servo member, the compressed pressure medium being able to be supplied to the abutment member and returned into a trip position for the return of the abutment member. It is particularly preferred for atmospheric air to be employed for the return of the abutment member, such air being aspirated during the upward stroke of the electrical servo member and entering the pressure chamber, wherein it is then compressed during the downward stroke of the electrical servo member by the piston coupled kinematically with it. It is convenient for an atmospheric pressure input line to be provided for this purpose, which is connected with the surroundings, the atmospheric pressure input line being provided with control means, which are able to be so switched that the pressure line is closed during the downward stroke, whereas during the upward stroke it is opened into the pressure chamber for the purpose of aspirating atmospheric air into the pressure chamber.

As control means a check valve is for example suitable. It is however possible to have other control means, as for example other types of valves.

In the case of a further development of the invention the damping means comprises at least one damping piston, which runs in at least one damping cylinder and is coupled with the abutment member and also comprises a choke member damping the piston's motion and constituting a resistance to flow for the pressure medium exiting during the piston motion. On retraction of the abutment member there is therefore, as a consequence of the motion of the damping piston, a displacement of the air present in the damping cylinder via the choke means so that the retraction movement of the abutment member is damped. The damping cylinder is in the trip position preferably connected by way of at least one pressure line with the pressure chamber so that the air displaced by means of the piston in the pressure chamber may flow to the damping cylinder where it may extend the abutment member out into its first abutment position.

The connection between the damping cylinder and the pressure chamber may be so designed that a first stationary pressure line leaving the pressure chamber and a second pressure line moving with the movement of the piston are provided, a flow bridge being formed between the first and the second pressure line.

Preferably a stationarily arranged venting pressure line is provided for venting the damping cylinder during the damping operation, a venting pressure line being formed—in the top position extending into the path of movement of the abutment member—which constitutes a flow bridge between the second pressure line and the venting line. Accordingly the air displaced from the damping cylinder by flow off into the atmosphere.

It is possible for the electrical servo member to be in the form of an electrical rotary drive. For instance an electrical rotary drive can be provided in the form of a lead screw drive. As an alternative it is possible as well to provide an electrical servo motor, which by way of a crank transmission or a rack and pinion arrangement converts the rotary drive movement produced by the electrical servo motor into a linear movement. As an alternative it is possible as well to employ a linear motor or an electromagnetic linear direct drive as an electrical servo member.

The invention furthermore contemplates an abutment module with the features of the independent claim 12. As regards further detail attention is drawn to the above description and the following description of preferred working examples of the invention.

The further electrical servo member, which is utilized for the return movement of the abutment member, may be in design similar or identical to the electrical servo member, which is employed for the upward and downward movement of the abutment member.

Further advantageous developments and convenient forms of the invention will be understood from the following detailed descriptive disclosure of preferred embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
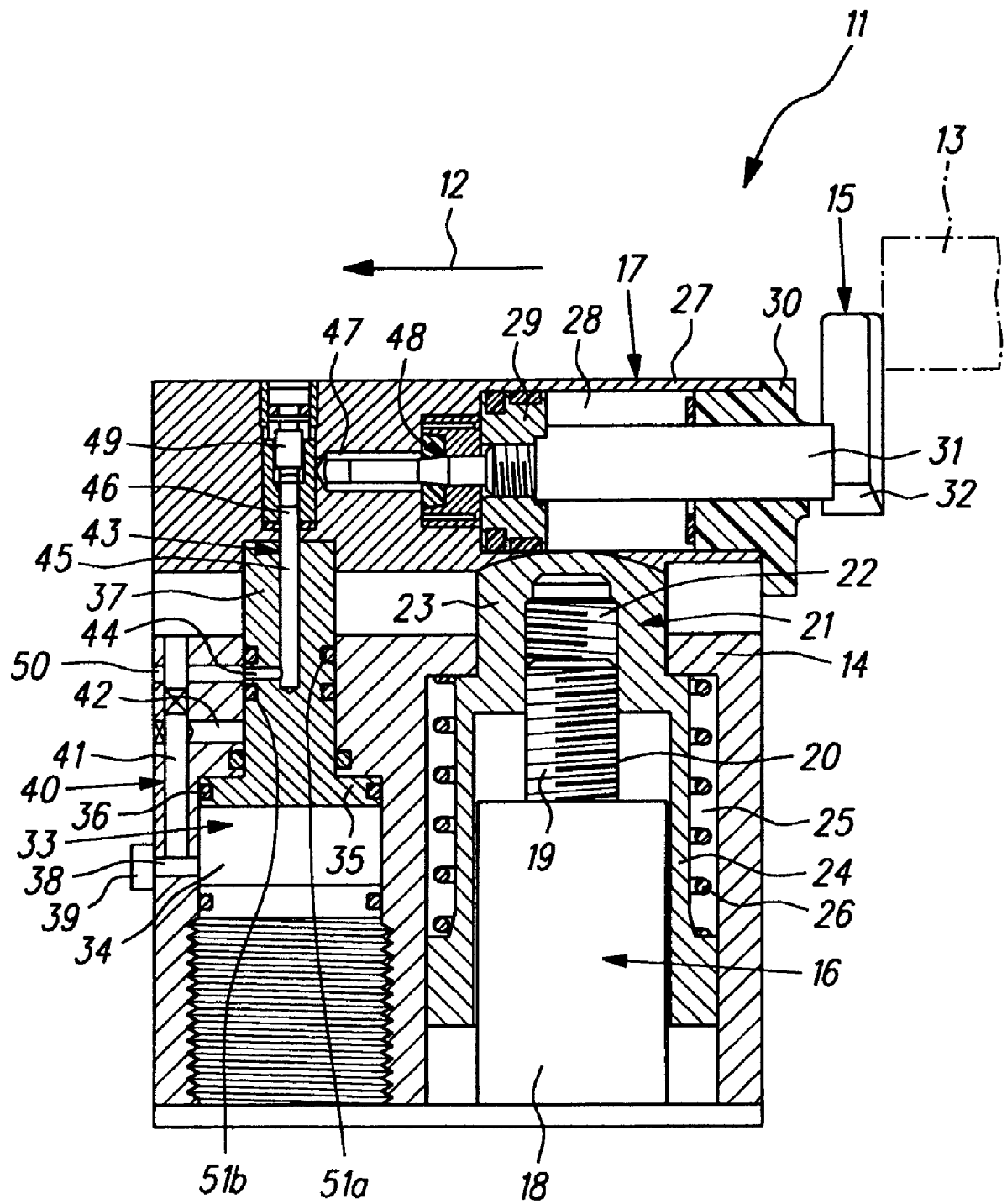
FIG. 1 shows a first working example in a longitudinal sectional view, the abutment member being illustrated in its top position projecting into the path of the movement of the articles and in its retracted terminal abutment position, an article to be singulated having struck the abutment member.
Figure 2:
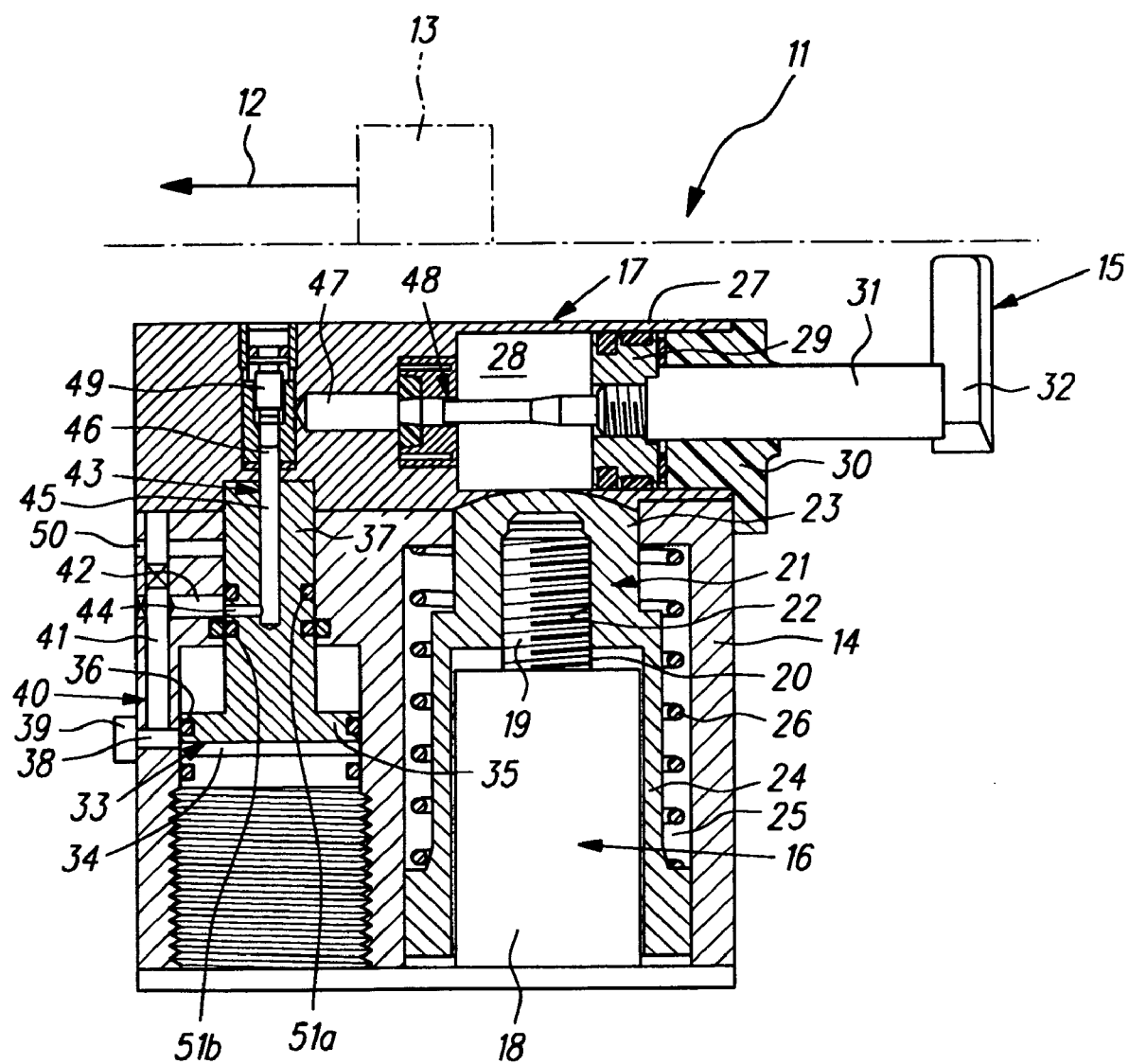
FIG. 2 illustrates the abutment module of FIG. 1 with the abutment member in a position located underneath the articles' path of movement and with an article to be singulated having struck the abutment member.

FIGS. 1 and 2 illustrate a first working example of the abutment module 11 in accordance with the invention. The abutment module is preferably employed in automatic processing and conveying systems in order to singulate articles 13 proceeding in a plane of motion in a process movement means 12, as for instance workpieces or the like. After such singulatation the articles may then be separately treated, as for example processed, diverted and the like.

The abutment module 11 comprises a base body 14 provided with an abutment member 15, which by means of an electrical servo member 16 may be shifted out of the plane of movement of the articles 13 and back into it. Furthermore there is a damping means 17 by means of which the abutment member 15 may be shifted from a first abutment position as far as a second terminal abutment position in a damped manner.

The electrical servo member 16 is in accordance with FIGS. 1 and 2 shown for example essentially in the form of a lead screw drive 16. The lead screw 16 essentially comprises a drive unit 18, which drives a lead screw 19, coupled with it, in rotation. The drive unit 18 and the lead screw 19 are stationarily mounted. The spindle 19 possesses a male thread 20 so cooperating with a female thread 22 formed inside the lead screw nut that the lead screw nut 21 is screwed to a greater or lesser extent dependent on the direction of rotation of the lead screw, that is to say the lead screw nut 21 selectively performs an upward or a downward stroke.

The lead screw nut 21 possesses a head section 23 which is connected with the damping means 17, to be described in more detail in the following, and fits around a sleeve section 24 surrounding the drive unit 18 of the lead screw drive 16 as a sleeve. On the surrounding face of the sleeve section 24 there is a hollow cylindrical recess 25 in which the stroke aiding means in the form of a spring 26 are integrated. The spring 26 bears on the one hand stationarily on the base body 14 and on the other hand it bears against a terminal portion of the sleeve section 24.

The damping means 17 serves, as mentioned above, for damped motion of the abutment member 15 from the first abutment position into a second terminal abutment position. The damping means 17 includes a damping cylinder 27 having a cylinder space 28 wherein a damping piston 29 runs and in sealing contact, due to a piston seal, with the bore of the cylinder space 28.

On the damping piston 29 an L-shaped abutment member 15 is arranged which extends through an end plate 30 or cover terminating the cylinder space 28. The abutment member 15 is in this case for example in the form of a two-part abutment member 15, with a piston rod-like base body 31 connected with the damping piston 29 and with an upwardly cranked limb 32 which is connected with the base body 31 by way of attachment means. It is naturally also possible to use an integrally formed abutment member.

For the return of the abutment member 15 from its terminal abutment position depicted in FIG. 1 into the first abutment position in accordance with FIG. 2 return means in the form of at least one energy storage means 33 are provided, which is able to be recharged by the downward stroke of the lead screw drive 16 and whose stored energy may be employed for the return of the abutment member 15 into the first abutment position. As an energy storage means a pressure storage means 33 is provided, which exhibits at least one pressure chamber 34, formed in the base body 14, using air as the pressure medium, which is able to be compressed by a piston 35 kinematically coupled with the lead screw drive 16, the compressed pressure medium being able to be supplied in a first trip position, illustrated in FIG. 2, for return of the abutment member 15 to same. The piston 35 is in sealing engagement with the bore of the pressure chamber by way of a piston seal 36. The coupling of the piston 35 with the lead screw drive 16 is by way of a piston rod-like tail 37 which is connected-more particularly integrally with the piston 35 and on the other hand in a movingly stable manner with the damping cylinder 27, the same being for its part coupled with the lead screw drive 16 using the head section 32 of the lead screw nut 2.

The pressure chamber 34 is connected by way of a surroundings pressure input line 38 connected with the surroundings, the surroundings pressure input line 38 being provided with control means in the form of a check valve 39 able to be so switched that the pressure line is closed during a downward stroke of the lead screw drive 16, whereas it is opened during the upward stroke for the purpose of drawing air from the surroundings into the pressure chamber 34. Moreover, a first pressure line 40 is provided extending from the pressure chamber 34 and which for example may branch off from the pressure input line 38 connected with the surroundings. The first pressure line possesses a vertical section 41 and a horizontal section 42 extending from it substantially at a right angle. The first pressure line 40 is formed in the base body 14 and is accordingly stationary. Furthermore a second pressure line 43 is provided, which is formed in the piston rod-like tail 37 on the piston 35. The second pressure line 43 also possesses a horizontal section 44 and a vertical section 45 connected therewith essentially at a right angle. The vertical section 45 opens into a duct 46 formed in the damping cylinder 27, such duct 46 being connected with a third pressure line 47. The third pressure line 47 finally opens into the space 28 in the damping cylinder 27. The damping means 17 furthermore exhibits a choke means 48 which is constitutes a flow resistor for air emerging during movement of the piston. For fine adjustment of the damping action furthermore adjustment means 49 are provided, as for example an adjustment screw extending in the duct 46 and using such screw it is possible to selectively constrict or widen the connection between the third pressure line 47 and the duct 46 so that then again the choking effect may be increased or reduced, the last named action setting the damping action.

Furthermore a substantially horizontally extending venting pressure line 50 is provided in the base body 14 in order to vent the cylinder space 28 during the damping operation.

In the situation indicated in FIG. 1 the abutment member 15 is in its top position extending into the path of motion of the articles 13 and an article 13 to be singulated strikes the abutment member 15. The impact of the article is damped by means of the damping means 17, the air present in the space 28 of the damping cylinder 27 being displaced by means of the piston 28 by way of the choke means 48 so that the displaced air flows through the third pressure line 47 into the duct 46, thence into the vertical section 45 and finally into the horizontal section 44 of the second pressure line 43. The position of the piston 35 is such in FIG. 1 that the horizontal section 44 of the second pressure line constitutes a flow bridge with the venting pressure line 50 so that the displaced air may leave into the surroundings. In the pressure chamber 34 there is air from the surroundings aspirated by way of surroundings pressure input line 38, such air being held in the first pressure line 40 without being able to flow on farther, since between the first pressure line and the second pressure line there is no flow bridge in this position.

In order to move the abutment member 15 into its retracted position indicated in FIG. 2 underneath the path of movement of the articles 13, the lead screw drive 16 is activated and the lead screw 19 turned so that the lead screw nut 21 screws along the lead screw. In the extended position illustrated in FIG. 1 of the abutment member 15 an article 13 to be singulated will generally have struck the abutment member 15 and this is in contact with the abutment member 15. Accordingly during the downward stroke of the abutment member 15 there will be friction between the latter and the article 13. This requires additional stroke force, since in this case force is supplied by the stroke aiding means in the form of the spring 26. Since the spring 26 is stressed in the extended position of the abutment member 15, accordingly it may relax during the downward stroke again and thus additionally make its stroke force, supplied by the lead screw drive 16, available.

During the downward stroke the piston 35 moves downward so that the atmospheric air in the pressure chamber 34 is compressed. The piston 35 reaches a trip position during the downward stroke and in this position a flow bridge is formed between the horizontal section 42 of the first pressure line 40 and the horizontal section 44 of the second pressure line 43 so that the compressed air located in the pressure chamber 34 flows by way of the first and the second pressure line 40 and 43 into the duct 46, thence to the third pressure line 47 and thence into the cylinder space 28. Accordingly the damping piston 29 is acted upon by compressed air so that the abutment member 15 is returned from its terminal abutment position illustrated in FIG. 1, into its first abutment position. The abutment module 11 is now ready to singulate a new article 13 if the abutment member 15 is shifted into the top position in the path of motion of the articles 13. During the downward stroke of the piston 35 the check valve 39 ensures that the air in the pressure chamber 34 can not escape into the atmosphere by way of the surroundings pressure input line 38.

FIG. 2 shows that seals 51$a$ and 51$b$, for instance in the form of sliding ring seals, are provided above and below the horizontal section 44 of the second pressure line, such seals preventing air passing over the outer wall of the piston rod-like tail 37 into the surroundings and therefore no longer being available for extending the abutment member 15.

Figure 3:
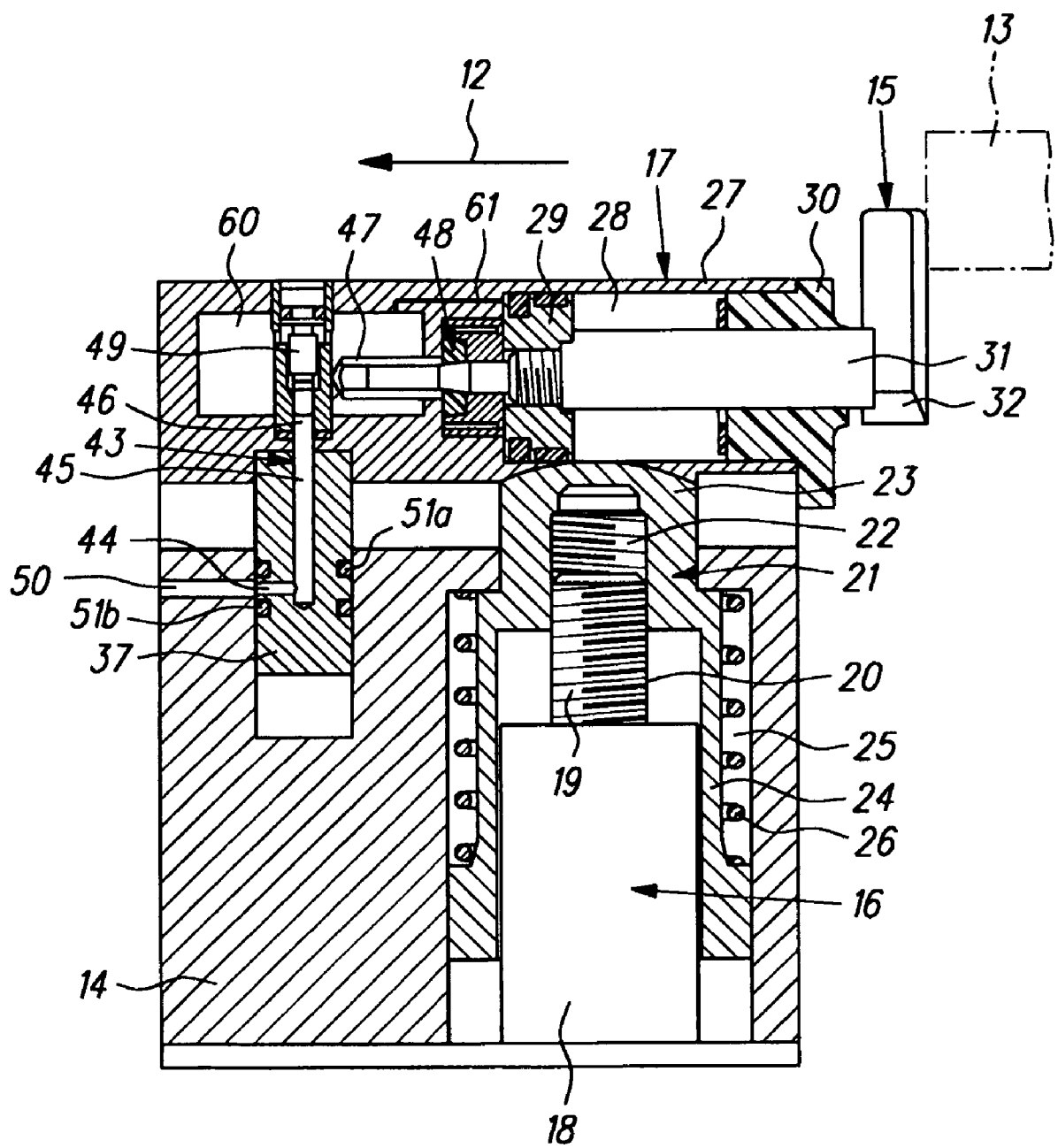
FIG. 3 shows a second working example of the abutment module in accordance with the invention in a diagrammatic longitudinal sectional elevation, an electrical servo drive being employed for the return of the abutment member.

FIG. 3 shows a second working example of the abutment module 11 in accordance with the invention differing from the first working embodiment in as far as instead of an energy storage means a further electrical servo member 60 is utilized for the return of the abutment member 15. As a further electrical servo member 60 an electrical rotational drive may be employed, which by way of converting means 61 converts a rotational drive movement into a linear movement which again serves for return of the damping piston. The air displaced during the damping operation can flow by way of the second pressure line 43 in the piston rod-like tail 37 into the venting pressure line 50 and thence into the surroundings. It is possible to activate the further servo member 60 by way of a position sensor when the lead screw drive 16 performs its downward stroke.

The invention claimed is:

1. In an abutment module, in particular for automatic processing and conveying means, comprising an abutment member, arranged on a base body, for articles moving in a plane of motion in a current working direction, which by means of an electrical servo member is able to be shifted back by a downward stroke out of the plane of motion and by means of an upward stroke back into the plane of motion, a damping means, coupled with the abutment member, in order to shift the abutment member from a first abutment position to a second terminal abutment position in a damped manner and return means for the return of the abutment member form the terminal abutment position to the first abutment position, wherein as a return means at least one energy storage means is provided, which is able to be charged by the downward stroke of the electrical servo member and whose stored energy is available for return of the abutment member into the first abutment position.

2. The abutment module as set forth in claim 1, wherein the energy storage means is in the form of a pressure storage means.

3. The abutment module as set forth in claim 2, wherein the pressure storage means comprises at least one pressure chamber with gaseous pressure medium, which is able to be compressed by a piston kinematically coupled with the electrical servo member, such compressed pressure medium being able to be supplied in a trip position for return of the abutment member.

4. The abutment module as set forth in claim 3, wherein the said pressure medium is air.

5. The abutment module as set forth in claim 3, wherein the pressure chamber is connected by way of a surroundings pressure input line with the surroundings, the surroundings pressure line being provided with control means which are able to be so switched that the surroundings pressure line is closed during such downward stroke, whereas the surrounding pressure line is open during the upward stroke for the purpose of aspirating air from the surroundings into the pressure chamber.

6. The abutment module as set forth in claim 5, wherein as control means a check valve is provided.

7. The abutment module as set forth in claim 3, wherein the damping means exhibits at least one damping piston running in a damping cylinder and coupled with the abutment member and a choke means for damping the piston movement and having a flow resistor for the pressure medium exiting during piston movement, the damping cylinder being connected in the trip position by way of at least one pressure line with the pressure chamber.

8. The abutment module as set forth in claim 7, comprising a first stationary pressure line extending from the pressure chamber and a second pressure line, adapted to move with the piston kinematically coupled with the electrical servo member, a flow bridge being formed in the trip position between the first and the second pressure line.

9. The abutment module as set forth in claim 8, comprising a venting pressure line, which in the top position, extending into the path of movement of the articles, constitutes a flow bridge between it and the second pressure line.

10. The abutment module as set forth in claim 1, wherein said electrical servo member is in the form of an electrical rotational drive.

11. The abutment module as set forth in claim 10, comprising a lead screw drive as said electrical rotational drive.

* * * * *